UNITED STATES PATENT OFFICE.

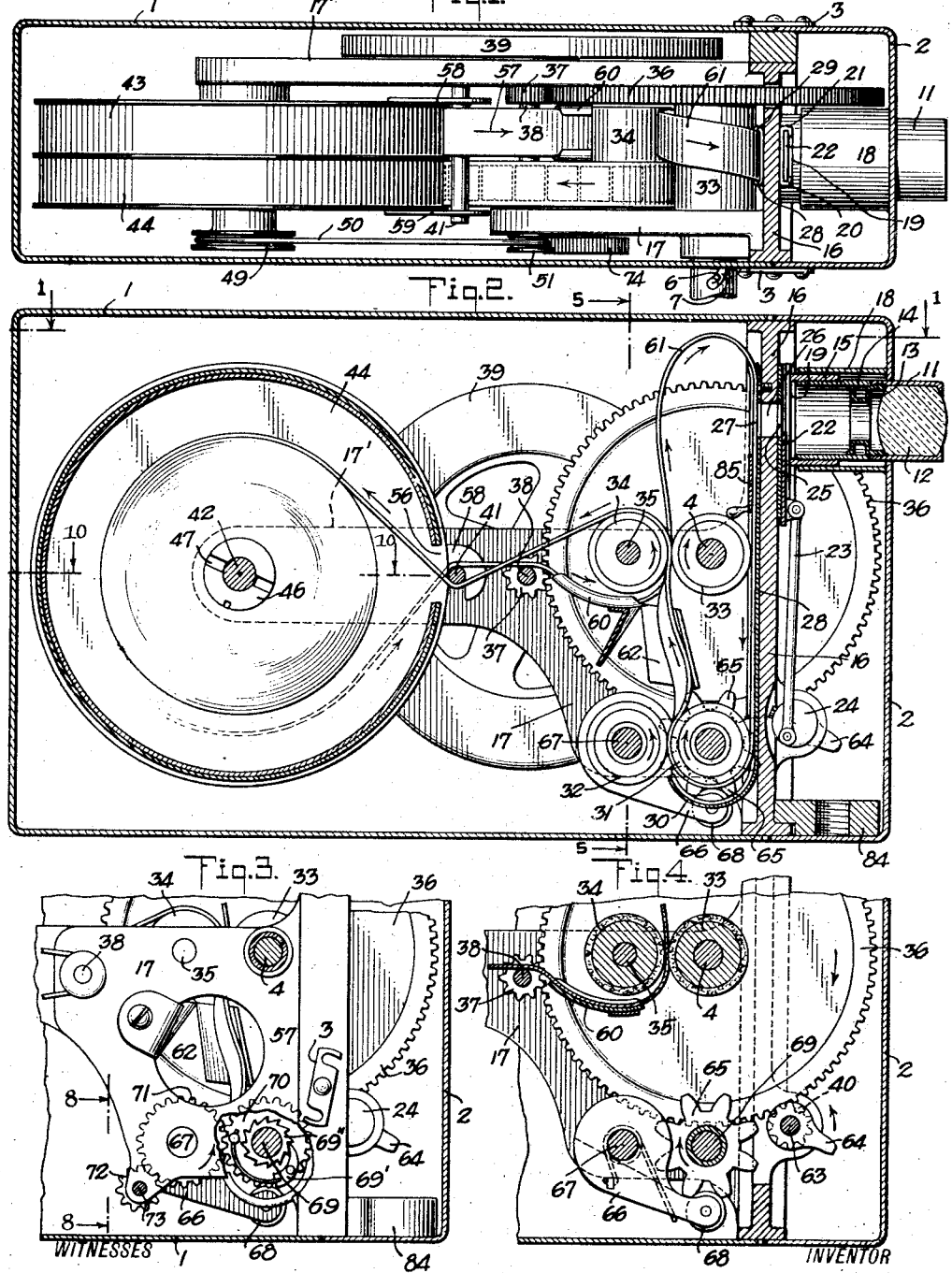

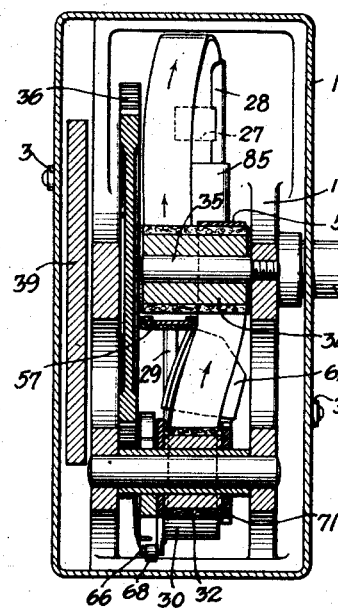
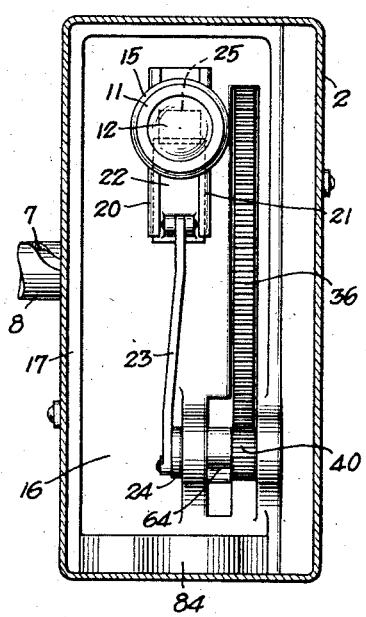
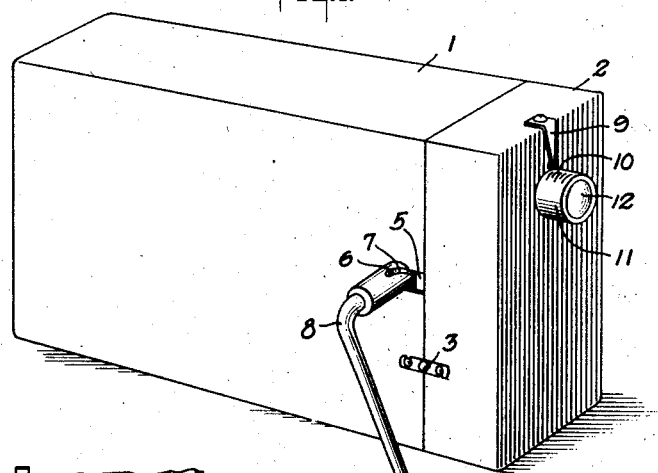
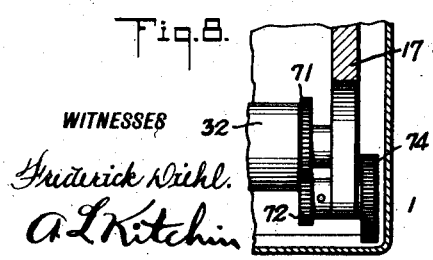

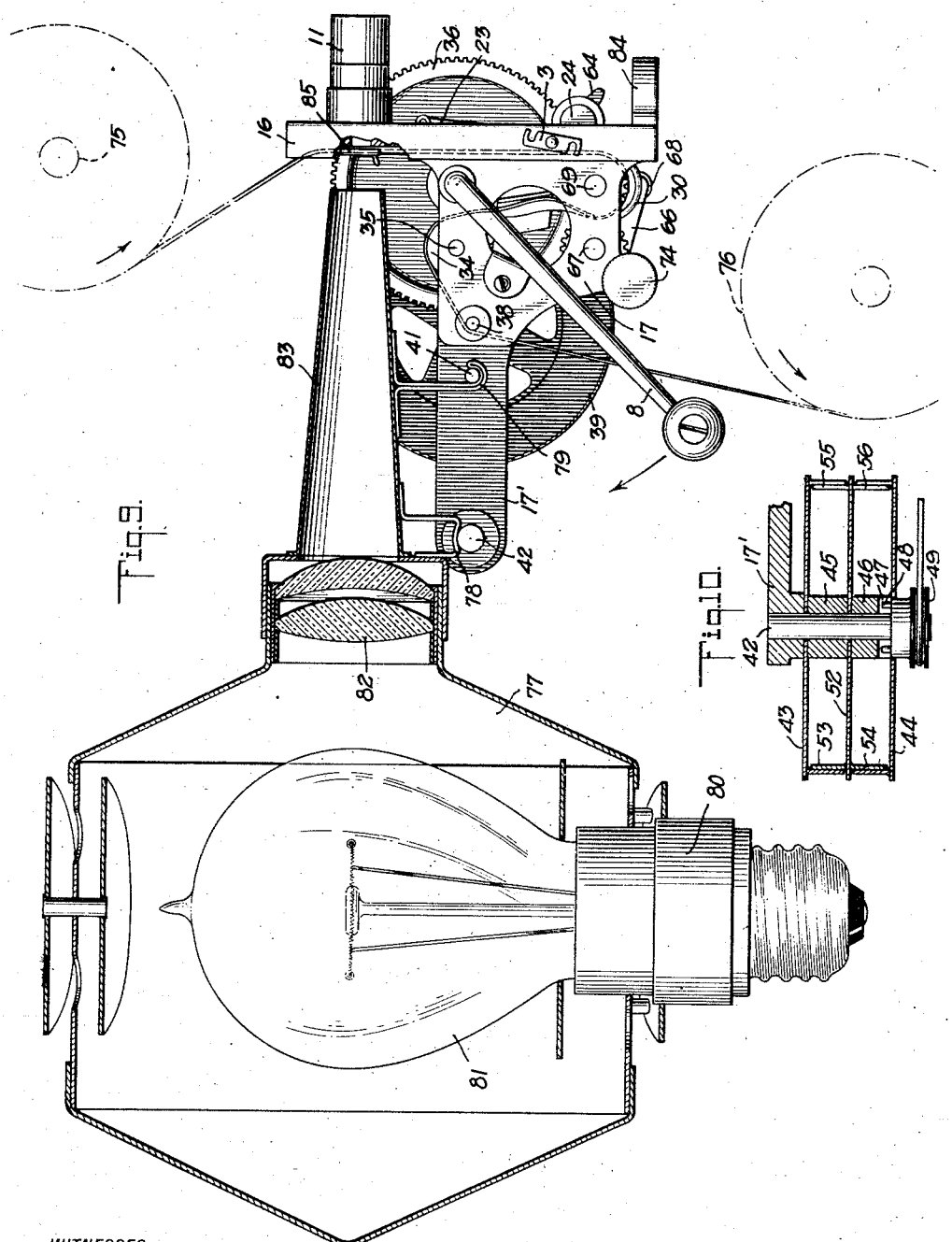

DEMETRIOS TAIFIRNOPOULOS, OF NEW YORK, N. Y.

MOVING-PICTURE CAMERA AND PROJECTOR.

1,368,860.  Specification of Letters Patent.  Patented Feb. 15, 1921.

Application filed October 3, 1919. Serial No. 328,122.

*To all whom it may concern:*

Be it known that I, DEMETRIOS TAIFIRNOPOULOS, a citizen of the United States, and a resident of the city of New York, borough of Manhattan, in the county and State of New York, have invented a new and useful Moving-Picture Camera and Projector, of which the following is a full, clear, and exact description.

This invention relates to a combined moving picture camera and projector and has for an object to provide means wherein the parts may be quickly and easily adjusted or re-arranged to act as a camera or as a projecting machine.

Another object of the invention is to provide an improved simplified comparatively small construction for family use, the structure being such that a minimum space will be required for its use.

A still further object of the invention is to provide an improved construction wherein the shutter mechanism will act as a shutter either for the camera or the projector.

In the accompanying drawings:

Figure 1 is a horizontal sectional view through the structure shown in Fig. 2, on line 1—1, the mechanism being shown in elevation.

Fig. 2 is a central vertical sectional view through a camera structure disclosing an embodiment of the invention.

Fig. 3 is a detail fragmentary view partially in section illustrating the framing structure and deflector for returning the film.

Fig. 4 is a fragmentary sectional view through the feed rollers and associate parts showing how the film is moved from the reel and also showing the intermittent motion mechanism.

Fig. 5 is a sectional view through Fig. 2 on line 5—5.

Fig. 6 is a front view of the construction shown in Fig. 1, the front cap being shown in section.

Fig. 7 is a perspective view on a slightly reduced scale, showing the entire camera arranged in a casing ready for use.

Fig. 8 is a fragmentary sectional view showing the framing wheel and associate parts, the same being taken approximately on line 8—8 of Fig. 3.

Fig. 9 is a side view of the camera mechanism associated with projector reels and a projecting lamp whereby the entire structure is converted into a projecting machine.

Fig. 10 is a longitudinal vertical section through Fig. 2, approximately on line 10—10.

In constructing a device embodying the invention a small casting or frame work is provided which supports the various parts and which co-acts with a film holder when acting as a camera and which co-acts with a projecting lamp and casing when acting as a projector. The operating mechanism is such that the film is coiled on a suitable drum as fast as it is uncoiled from a primary drum so that the device may be operated to take pictures until all the film has been exposed. The intention is to present a compact and simple structure which is especially designed for home use where anyone can take a complete film, or a number of films and then will project these films on the wall or screen of the home for home amusement. For this reason the parts are restricted in number to a minimum and simplified so as to be substantially fool-proof both in respect to the camera and the projecting outfit. In forming these two the various parts have been so made as to merely require the removal of one part of the camera in order to substitute the projecting casing, thus not requiring any re-adjustment of any parts of the moving mechanism.

In the accompanying drawings 1 indicates a casing which carries practically all of the operating parts of the camera, said casing being provided with a cover or cap 2 held in place by any suitable means, as for instance catches 3. A driving shaft 4 projects through a suitable slot 5 in casing 1, said shaft carrying a pin 6 which fits in a slot 7 in the crank 8 whereby the shaft 4 and parts associated therewith may be properly moved when the device is in operative position, as illustrated particularly in Fig. 7. A pointer 9 is provided on the cap 2, said pointer co-acting with graduations 10 on the shell 11 carrying a lens 12 whereby the focus may be varied as desired either when the device is used as a camera or as a projector. It is understood that preferably this lens is a short range lens because it is to be used as a projector in an ordinary house, but if desired the particular lens could be removed and a lens of greater range substituted. Preferably the shell 11 is threaded or otherwise rigidly secured to a tubular member 13 slidingly fitted into a sleeve 14, which sleeve is threaded into a threaded annular projection 15 connected in any desired manner rigidly to the front wall 16 of the casting 17. By this arrangement the sleeve 15 may be screwed in and out and thereby the lens 12 adjusted to secure the proper focus. In connection with the tubular projection 15 it will be noted that a tubular telescoping member 18 is connected with the cover 2 so as to slide thereover and thereby assist in excluding any stray light. From Fig. 2 it will also be noted that an opening 19 is provided in the tubular member 15, said opening being supplied with guideways 20 and 21 (Fig. 6) in which the shutter 22 is slidingly mounted. An operating or connecting rod 23 is pivotally connected to the shutter 22 and also pivotally connected to a disk 24, said last connection being off center so that when the disk is rotated the connecting rod and the shutter will be given a back and forth movement. The guideways 20 and 21 are preferably made from a single piece of metal having a flaring portion and the edges turned over for producing runways, said flaring portion being formed with an aperture 25 registering with the window 26 in the front wall 16 whereby as the shutter is moved back and forth said window will be opened and closed. An auxiliary window 27 is provided in a film guide 28 connected by screws or otherwise to the inner surface of wall 16, said film guide being provided with turned over edges facing each other for producing side guiding members 29. The film guide 28 extends from a short distance above the window 26 to near the bottom of the wall 16 and is provided at its bottom with an arc-shaped section 30 for guiding the film from the holder around roller 31 whereby it may freely pass between said roller and a framing roller 32. The roller 31 may be called the intermittent roller while the rollers 33 and 34 are feed rollers adapted to feed the film to the upper part of the guide 28 and also to move the discharging portion of the film to a discharge point. The feed roller 33 is rigidly connected in any desired manner with the main driving shaft 4 while the roller 34 is mounted on a shaft 35, which shaft is rigidly secured to frame 17 in any desired manner and the roller allowed to freely rotate thereon. Both rollers 33 and 34 are provided with a covering of rubber, leather or some other yielding material and mounted so as to press against the film sufficiently to cause a feeding action. The shaft 4 is also rigidly secured to a master gear wheel 36 which continually meshes with a pinion 37 secured to shaft 38, which shaft extends through part of the frame 17 and is rigidly secured to a fly wheel 39. The master gear 36 also meshes with a pinion 40 which causes certain operations hereinafter fully described when the device is in motion. At a suitable distance from the shaft 38 a pin or shaft 41 is provided, the same being connected to the frame 17 in any suitable manner, while at the extreme outer end of the projection 17' of frame 17 is arranged a shaft 42 which carries casings 43 and 44. As indicated in Fig. 1 the unexposed section of film is wound on the spool 45 in the casing 43 while the exposed part of the film is wound upon spool 46. This last mentioned spool has notches 47 for receiving the projections 48 of the hub of the wheel 49, which wheel is preferably a pulley and accommodates the belt 50, which belt also passes over a pulley 51 rigidly secured to the shaft 38. The casings 43 and 44 are held in place by a central frame 52 mounted on shaft 42, said frame having laterally extending annular flanges 53 and 54 over which the casings 43 and 44 slidingly fit. These casings are provided with openings 55 and 56 which register with similar openings in the flanges 53 and 54 whereby the film 57 may freely move out of one casing and back into the other casing. The casings just described, together with the frame 52 and pulley 49 are all easily removed as they are slidingly mounted on the shaft 42, said casings being held against rotary movement by the hook members 58 and 59 hooking over the rod 41 as indicated in Fig. 2.

When the device is in use the parts are arranged for instance as shown in Figs. 1 and 2 and as the crank 8 is rotated the shaft 4 will be rotated and the large master gear 36 will rotate the gears 37 and 40. The rotation of the shaft 4 will also cause a rotation of the rollers 33 and 34, roller 34 being loosely mounted on the shaft 35. The film 57 extends through the opening 55 and above the pin or rod 41 as shown in Fig. 2, from the pin 41 the film passes over the shaft 38 and into a suitable guideway 60, from this guideway it passes between the rollers 33 and 34, but is of such a width as to utilize slightly less than half the length of the rollers. From these rollers the film extends upwardly and makes a loop 61 before it enters the guiding members 28 and 29. As it passes along these guideways it naturally passes in front of the lens 12 and as shutter 22 is operated a proper exposure will be secured. The film after passing the lens moves downwardly and around the arc-shaped guide 30 and between the rollers 31 and 32. After leaving these rollers the film strikes a deflector 62 which guides the film to the rollers 33 and 34, but to such a position thereon as to not interfere with the film passing over guide 60 to the rollers. It will be noted that both sections of the film are moving upwardly through the rollers 33 and 34, the first section passing upwardly into loop 61 while the second section deflected by the deflector 62 passes roller 34, preferably beneath the pin 41 and is wound on the spool 46 from which it is later taken to the developer. In order to cause the film to stop at the time that the shutter 22 is open and thereby secure proper exposure an intermittent movement is provided adjacent the pinion 40, same being shown somewhat in detail in Fig. 4. This intermittent motion is very simple and includes the pinion 40 as a driving member, which pinion is preferably rigidly secured to the shaft 63 which it rotates, said shaft being also rigidly secured to a single projection or tooth 64 co-acting with the large toothed gear 65. This gear is connected with the roller 31 so as to move said roller intermittently, or for the distance of one picture upon each revolution of the tooth member 64. This connection consists of any form of means for securing the gear wheel 65 to shaft 69, as for instance by a key. The roller 31, however, is loosely mounted on the shaft 69, but is connected therewith by a spring pressed pawl 69′ co-acting with a ratchet 69″ formed integral with or rigidly secured to the shaft 69. The ratchet wheel 69″ is faced in such a direction that whenever shaft 69 is rotated by the gear 65 pawl 69′ will be moved and consequently the roller 31 on which it is mounted will be moved for the distance of one tooth on gear 65. This arrangement allows the roller 31 to be moved backwardly by a framing structure hereinafter fully described. A spring pressed arm 66 is pivotally mounted on the shaft 67 carrying the roller 32, said arm carrying a small stop roller 68 normally held by the spring-actuated arm 66 so as to contact with two of the teeth on the gear wheel 65 and thereby resist movement in either direction. The roller 32 is loosely mounted on the shaft 67 so as to freely rotate. However, in order that these rollers may operate always in unison interlocking or meshing gears 70 and 71 are rigidly secured to the respective rollers 31 and 32 and a small pinion 72 is supported by the frame 17 and meshes continually with the gear 71, said roller being rigidly secured to a shaft 73, which shaft projects a short distance beyond the frame 17 and carries a finger operated member 74 whereby the rollers 31 and 32 may be actuated manually at any time for producing a framing action. The pawl and ratchet arrangement 69′ and 69″ permits this independent movement of the rollers 31 and 32 while allowing the intermittent motion to properly function at all times. It will be noted that the rollers 33 and 34 are continuously moving while the device is in operation and consequently continuously feed the film into the loop 61, but the film is not moving past the lens until the rollers 31 and 32 are actuated, the movement of which are quick and timed to take place when the shutter 22 is closed.

When using the device as a projector the casings 43 and 44 and frame 52 and associate parts are removed, including the belt 50 and the film slightly rearranged as shown in Fig. 9 so that the film may be fed from a spool 75 to the guides 28 and 29 and from the roller 34 over shaft 38 to a spool or reel 76 while the pins or rods 41 and 42 act as supports for the projecting apparatus. The projecting apparatus is provided with a casing 77 having a supporting shoe 78 resting on pin 42 and a retaining hook 79 hooked over the pin 41. The casing 77 may be formed in any desired way, as for instance in a simple manner as shown in Fig. 9, where it is made out of sheet metal provided with suitable openings at the top and also at the bottom for ventilation and an opening through which the lamp socket 80 projects, said lamp socket carrying a lamp 81. Preferably the center of the lamp 81 is opposite the condensing lenses 82 whereby the beam of light from the lamp may be properly projected through the film and lens 12 to the screen. The frame 17 may be supported in any desired manner, as for instance by having a bolt passing through the opening in the projection 84 and through a suitable supporting table, platform or other device. When the projector is used an auxiliary shutter 85 is used, said shutter straddling the guides 28 and 29 and movable thereon so as to be moved over the film opposite the end of the nozzle 83 so that the film will be protected when stationary. After the parts have all been properly adjusted this shutter may be moved downwardly out of the way and then the crank rotated at the desired speed for giving the proper effect. In case the machine stops before the end of the film has been reached the shutter is again moved upwardly in place where it remains under the action of friction.

In manufacturing the complete machine the parts may be made of any size, but preferably are made comparatively small so as to readily fit into the pocket of the operator. It will be noted that the construction is arranged so as to properly fit an elongated casing whereby sufficient mechanism may be provided and yet the parts caused to assume a proper shape to permit the complete machine to easily fit the pocket of ordinary clothes.

What I claim is:

1. A moving picture camera for household use comprising a casing, a tube extending through one wall of said casing, a lens carried by said tube, a crank arranged exteriorly of the casing, a power shaft connected with the crank, said shaft being principally within the casing, a film guide for guiding the film past said lens, intermittent feed for the film, a pair of driving rollers for moving the film from a supply to the guide, means connecting said power shaft with said driving rollers and with the intermittent feed for operating the same, a deflector for guiding the exposed film to said driving rollers, and means for receiving the exposed film as it leaves said driving rollers.

2. In a camera of the character described, an intermittent feed, comprising a pair of feed rollers, a toothed member connected with one of said feed rollers, a rotatable single tooth member adapted to mesh with the first mentioned toothed member, a shaft connected with said single tooth member for rotating the same whereby upon each complete rotation of the single toothed member said feed rollers will be moved forward a predetermined distance, a sliding shutter, a connecting link connected with said sliding shutter, and a crank member connected with said link and with said shaft whereby when the shaft is rotated the shutter and the intermittent mechanism will operate in timed relationship.

3. A moving picture camera comprising a casing, a lens, a guide having an opening therein opposite the lens, feed rollers of approximately twice the width of the film, means for supplying film to said feed rollers so that the film will be engaged by approximately half the roller before it enters said guide, a pair of intermittent rollers for moving the film past said lens, a deflector for moving the film from said intermittent rollers to the feed rollers, means for receiving the film from said feed rollers, and a shutter for covering the lens during the movement of the film.

4. A moving picture camera for household use comprising a casing, a lens, a power shaft, means for rotating said power shaft, a film guide for guiding the film past said lens, intermittent feed for said film, a pair of driving rollers for moving the film from the supply to the guide, means for connecting said power shaft with said driving roller and with said intermittent feed, a deflector for guiding the exposed film to said driving rollers, and means for receiving the exposed film as it leaves said driving rollers.

5. In a camera of the character described, an intermittent feed comprising a pair of feed rollers, a toothed member connected with one of said feed rollers, a rotatable single toothed member adapted to mesh with the first mentioned toothed member, a rotatable shaft connected with said single toothed member, a shutter, a link connected with said shutter, and a crank member connected with said link and with said shaft whereby when the shaft is rotated the shutter and the intermittent mechanism will be operated in timed relationship.

DEMETRIOS TAIFIRNOPOULOS.